Sept. 5, 1944.   A. J. FULLER   2,357,396
AUTOMATIC CONTROL MEANS FOR CHANGE SPEED MECHANISMS FOR MACHINE TOOLS
Filed June 22, 1943   6 Sheets-Sheet 1

INVENTOR.
ALFRED J. FULLER
BY
ATTORNEY

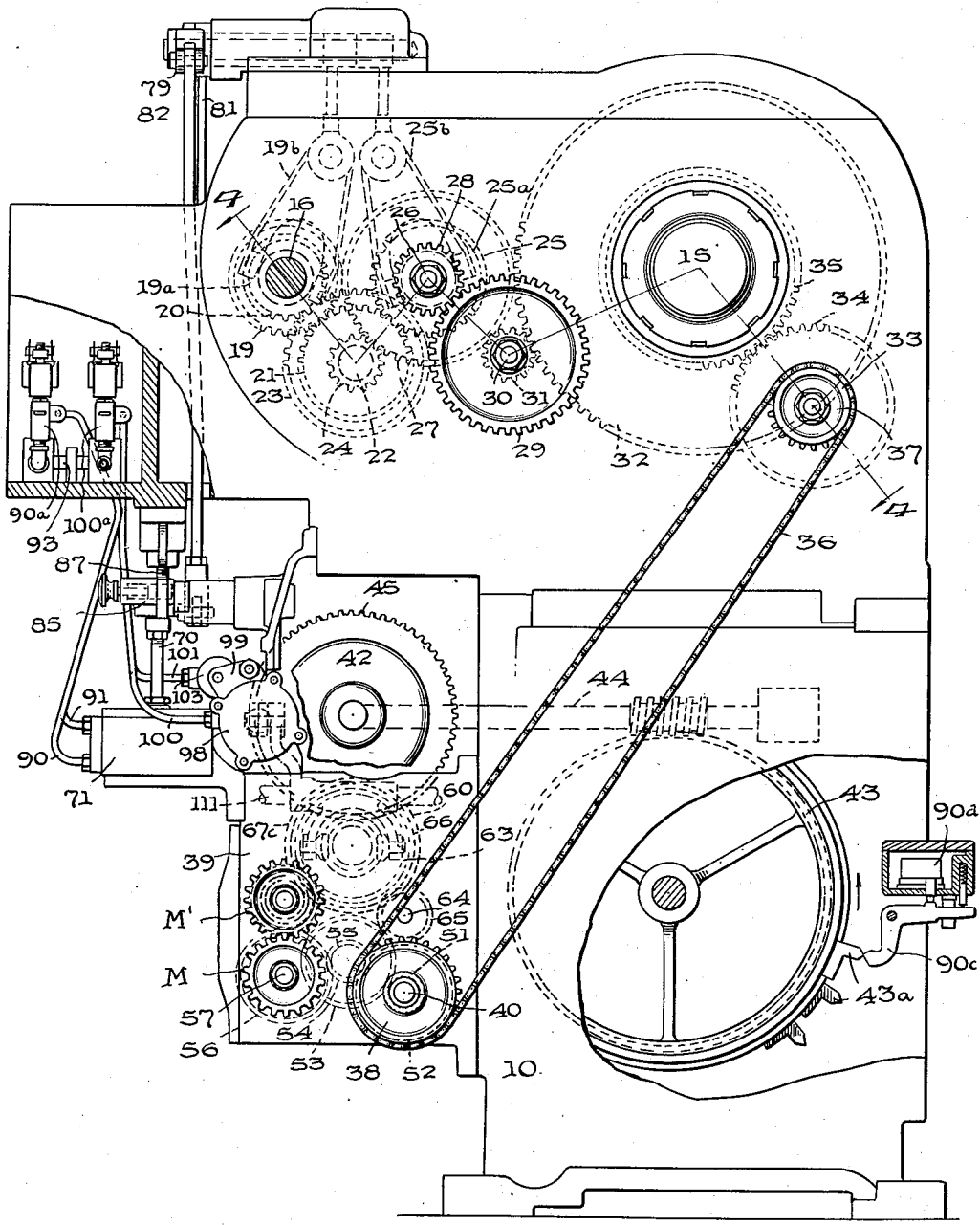

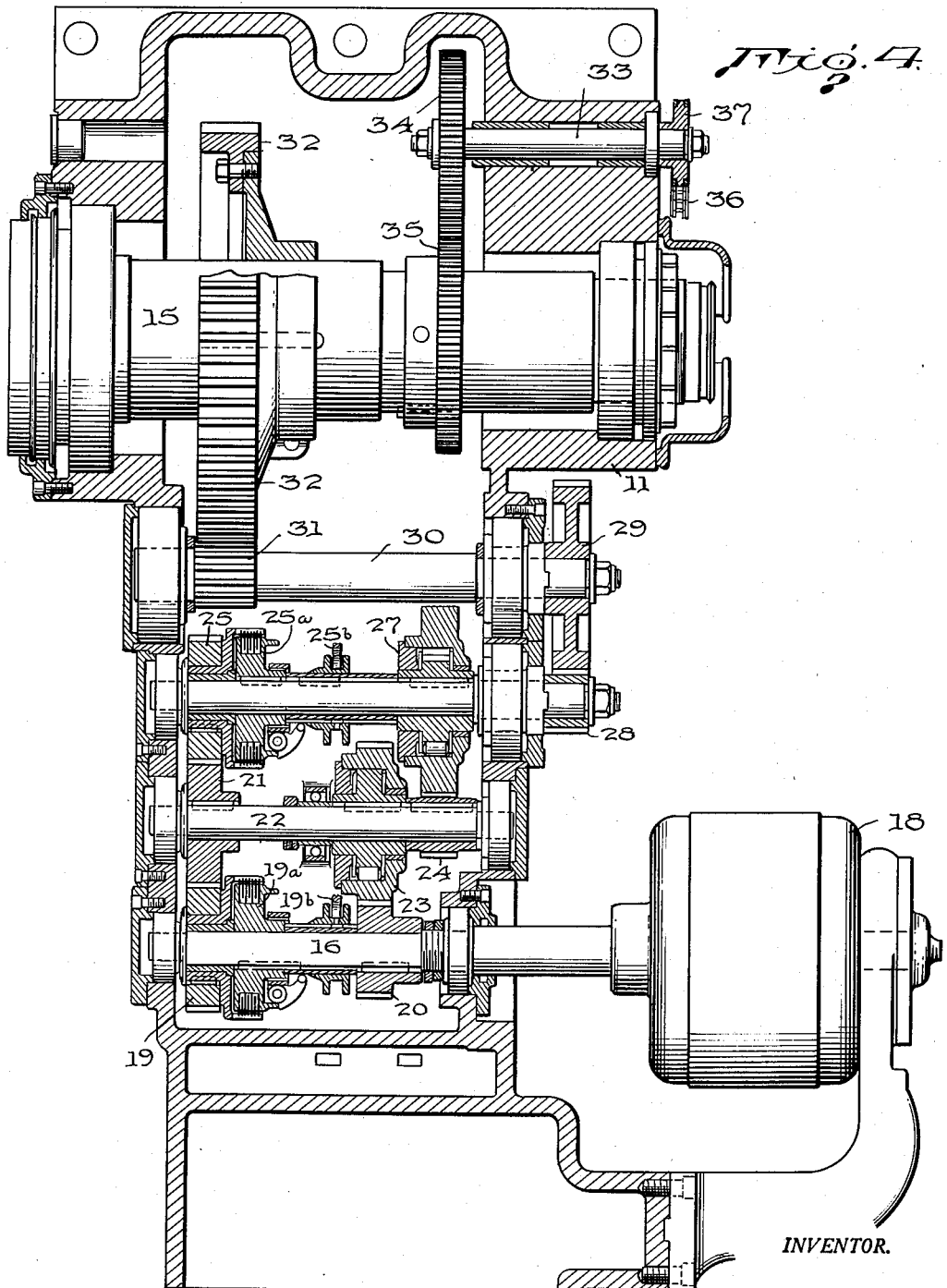

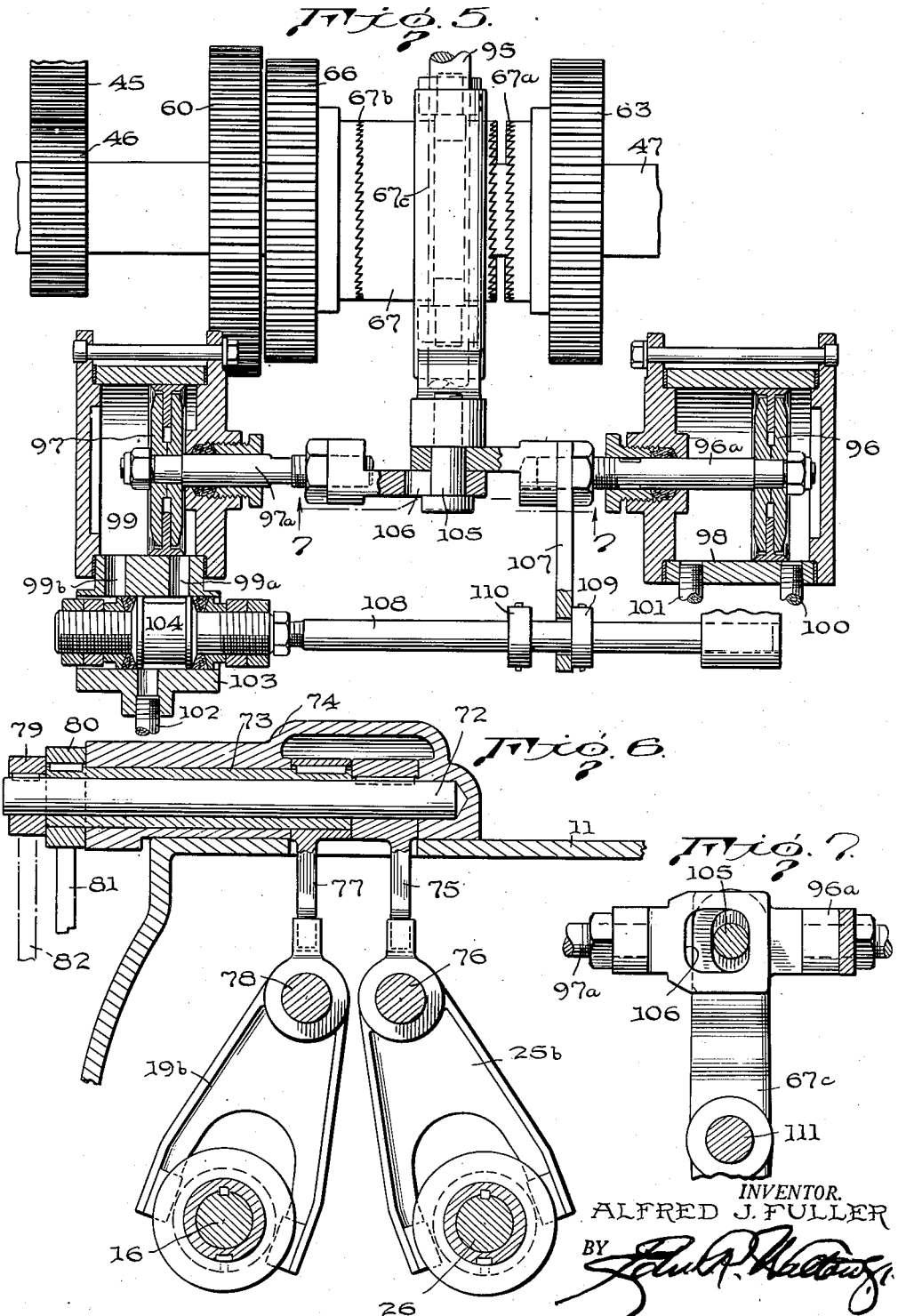

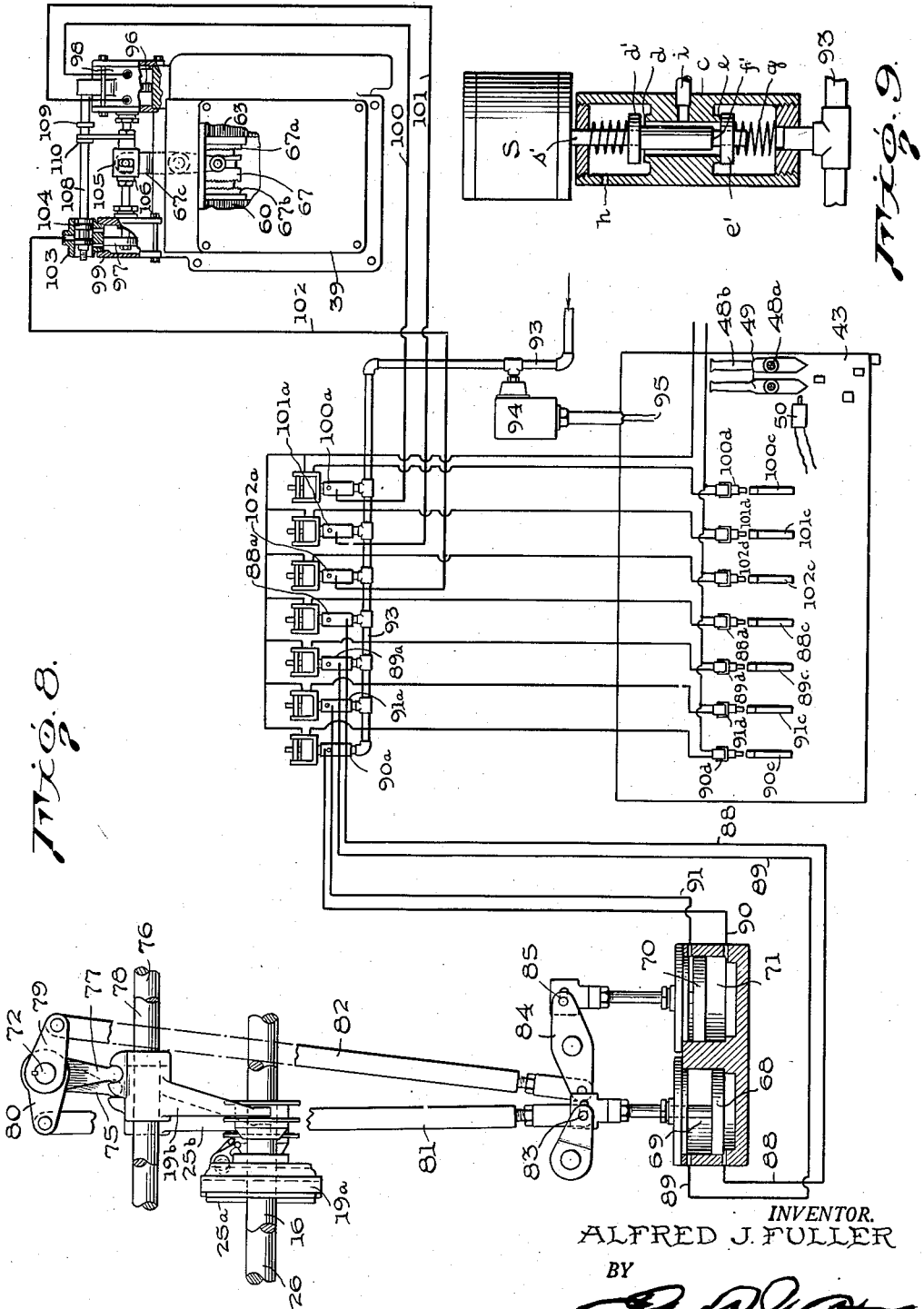

Patented Sept. 5, 1944

2,357,396

UNITED STATES PATENT OFFICE 2,357,396

AUTOMATIC CONTROL MEANS FOR CHANGE-SPEED MECHANISMS FOR MACHINE TOOLS

Alfred Joseph Fuller, Pawtucket, R. I., assignor to Potter and Johnston Machine Company, Pawtucket, R. I., a corporation of Rhode Island Application June 22, 1943, Serial No. 491,832

4 Claims. (Cl. 29—44)

The present invention relates to machine tools and is more particularly concerned with a new and improved system of clutch operation therefor, especially for automatic turret lathes where it is an important desideratum that the required changes or variations in the speed of the spindle and in the feed be accomplished instantaneously and with as simple a construction as possible.

Heretofore, in so-called mechanically operated machines, where clutches are employed for accomplishing the variations or changes in the spindle speed and feed speed, two different systems have been generally used. One of these systems involves a direct mechanical connection between a control device (such as a dog on a control dog wheel or drum) and the clutch shifting yokes; and the other by a so-called clutch shifting power unit shown in Figures 9 to 15 of United States Patent No. 1,881,928. The disadvantages of the first system mentioned above are to be found in the slow speed of the dog drum and its attendant sluggish engagement and disengagement of the clutches; and, while the second system mentioned is a decided improvement over the former, the second system is a rather complicated and costly unit to build, exceedingly sensitive to adjustment, and quickly subject to wear and replacement.

The present invention resides in combination with a machine tool, particularly of the above mentioned type, of an electric pneumatic control of the speed change clutches which assures the instantaneous engagement and disengagement of said clutches, eliminating undesirable drag, and also an accuracy of speed and feed change which can not be secured through either of the other two systems above described, these very desirable results being secured with a minimum of mechanical connections subject to wear and adjustment and at an extremely low installation cost.

The invention further resides in certain details of construction, combination and arrangement of parts of electro-pneumatic control mechanism particularly designed and useful in machine tools, especially of the automatic turret lathe type.

With the above and other objects in view, as will appear as this specification proceeds, the construction and arrangement of the present invention and its operation will now be described and particularly pointed out in the appended claims.

In the drawings which show the preferred embodiment of the invention as at present devised—

Figures 1 and 2, when read together (side by side), disclose a rear elevation of an automatic turret lathe equipped with the present invention;

Figure 3 is a view of the head stock end of the machine as shown in Figure 2, parts of the casing being broken away to illustrate the disposition of mechanism;

Figure 4 is a spreaded sectional view of the spindle power transmission means when taken substantially on line 4—4 of Figure 3 and looking in the direction of the arrows;

Figure 5 is an enlarged fragmentary view of the clutch mechanism for changing the speed of the feed and of the pneumatic means for actuating said clutch;

Figure 6 is an enlarged fragmentary transverse sectional view of the mechanism for operating the clutch yokes in the transmission means to the spindle thereof and taken substantially on line 6—6 of Figure 2;

Figure 7 is a detailed view of the connection between the change speed feed-clutch and the pneumatic means and taken substantially on line 7—7 of Figure 5;

Figure 8 is a shematic view of the spindle transmission clutch operating device, change speed feed-clutch operating device, and of the electropneumatic valve mechanism actuated from the dog drum, and which controls the operation of the first two mentioned devices; and Figure 9 is a sectional view of the electropneumatic valves employed for controlling the change speed mechanisms.

The present invention will now be described more in detail and throughout the specification and drawings like characters of reference will denote similar and like parts.

Figure 1:
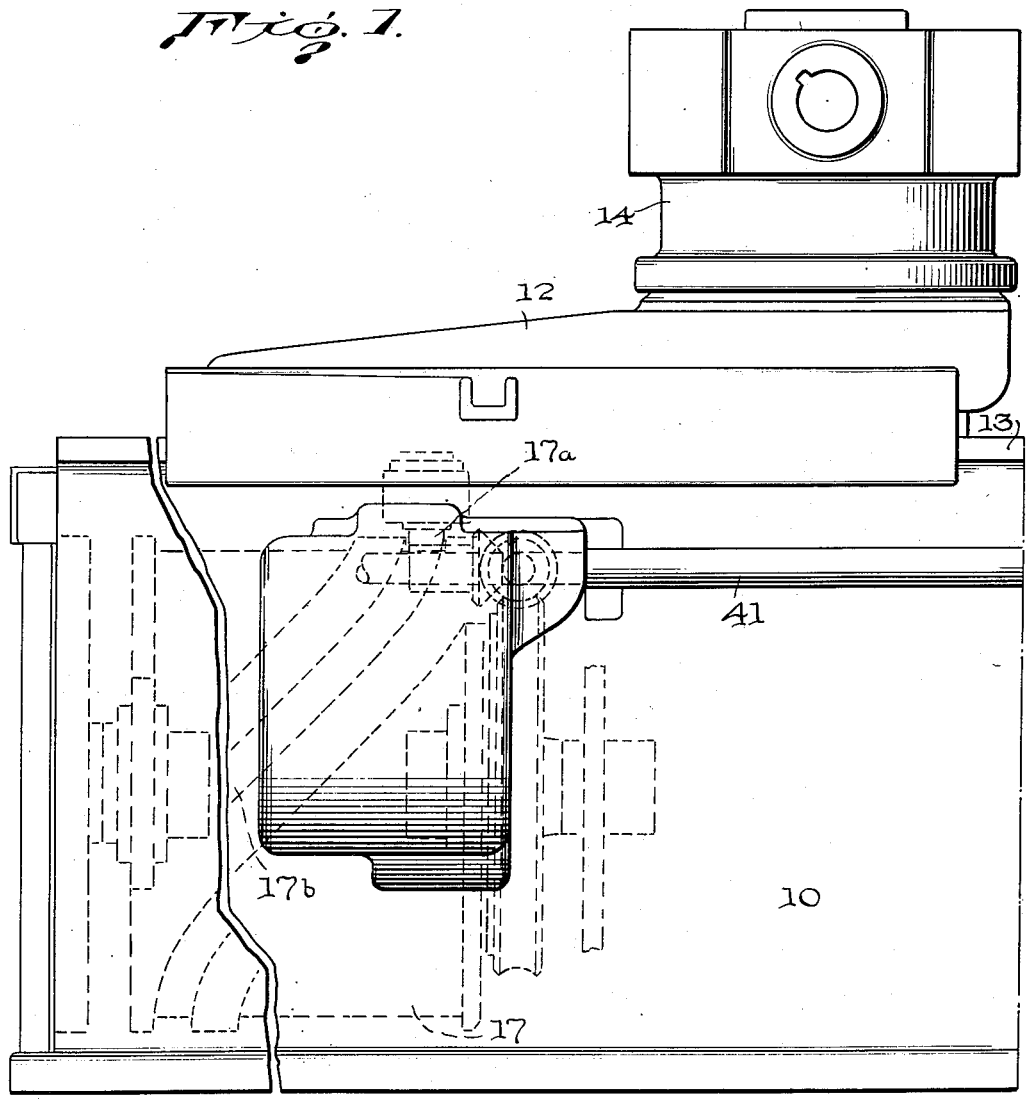

The type of machine tool illustrated in the drawings and to which the invention has particular reference is an automatic turret lathe, which generally has the following component parts—a base or bed 10 which comprises a hollow casting having on one end a head stock 11 and having mounted on the top of the base a turret slide or carriage 12 which reciprocates on ways 13 to and fro longitudinally of the base relatively to the head stock; an indexible turret 14 mounted on the slide or carriage 12 and cross slides arranged on the base between the head stock and the turret slide to move transversely of the base. The cross slides, last mentioned, are not illustrated in the present disclosure as their inclusion has no particular relation to the subject matter of the present invention, but reference may be had to United States Patent No. 1,881,928, where said cross slides are shown at 100 and the means for actuating them from the feed shaft, which also actuates the turret slide, is illustrated and described.

In the head stock unit 11 is mounted a spindle 15 which may have a chuck, work fixture or other work-holding device (not shown), affixed to the end thereof opposite the turret 14 as is well understood in the art. The spindle 15 is driven from a constant speed shaft 16 through intermediate shafts and clutches which provide for changes in speed through automatic control and through a direct connection between the spindle 15 and the cam drum 17, which operates the turret slide. a feed is provided which is always relative to the spindle revolutions.

The constant speed shaft 16 is driven from a belt pulley or an electric motor 18 (as the case may be), and has rotatably mounted thereon a gear 19 and also has keyed thereon a gear 20. The gear 19 meshes with a gear 21 keyed on the intermediate shaft 22 and the gear 20 meshes with an overrunning gear 23 (otherwise known as a three-roller gear) keyed on the shaft 22, which latter also has keyed thereon a pinion gear 24. The gear 21 on intermediate shaft 22 meshes with a gear 25 rotatably mounted on an intermediate shaft 26 while the pinion gear 24 on shaft 22 meshes with an overrunning gear 27 keyed on shaft 26. Keyed on an end of the shaft 26, extending exteriorly of the spindle transmission casing 11, is a gear 28 which meshes with a gear 29 similarly mounted and keyed on an end of an intermediate shaft 30 which also has a pinion gear 31 keyed thereon and meshing with the gear 32 surrounding and keyed on the spindle 15. The gears 28 and 29 are hand-pick-off gears (otherwise known as "hand change gears") which allow for a full range of the spindle speeds within the capacity of the machine according to the selection of hand change gears that is made to meet particular requirements. On constant speed drive shaft 16 is mounted also a friction clutch 19a whose fixed part is fastened to or part of the gear 19 and whose slidable part or cone is keyed to the shaft 16. Likewise on shaft 26 is mounted a similar friction clutch 25a whose fixed part is fastened to or part of the gear 25 and whose slidable part or cone is keyed to the shaft 26.

Thus, it will be seen that four different speed changes may be effected automatically for driving the spindle from the source of power 18— (1) by disengaging of both clutches 19a and 25a; (2) by engaging only clutch 19a; (3) by engaging only clutch 25a; (4) by engaging both clutch 19a and 25a.

In the headstock 11, a take-off shaft 33 (Figs. 3 and 4) is journalled and has a gear 34 fast thereon and meshing with a gear 35 on the spindle 15. From this shaft 33 power is taken to drive the feed mechanism which actuates the turret slide 12 (as well as the cross-slides not shown) during cutting operations of the tools carried by said slides. This power is transmitted through a sprocket chain 36 trained over sprocket wheel 37 fast on shaft 33 and over sprocket wheel 38 fast on shaft 40 journalled in transmission feed-box 39 carried at the side of the base 10 below the headstock 11 (Figs. 2 and 3).

The mechanism contained in feed-box 39 provides automatically three changes in speed of the feed-shaft 41, which is driven therefrom. The feed-shaft 41 drives cam drum 17, through suitable gear connections shown, and a cam follower 17a on the turret slide extends into the cam path 17b of the cam drum, thereby causing the turret slide to be reciprocated to and fro, relatively to the spindle 15, on its ways 13.

Figure 2:
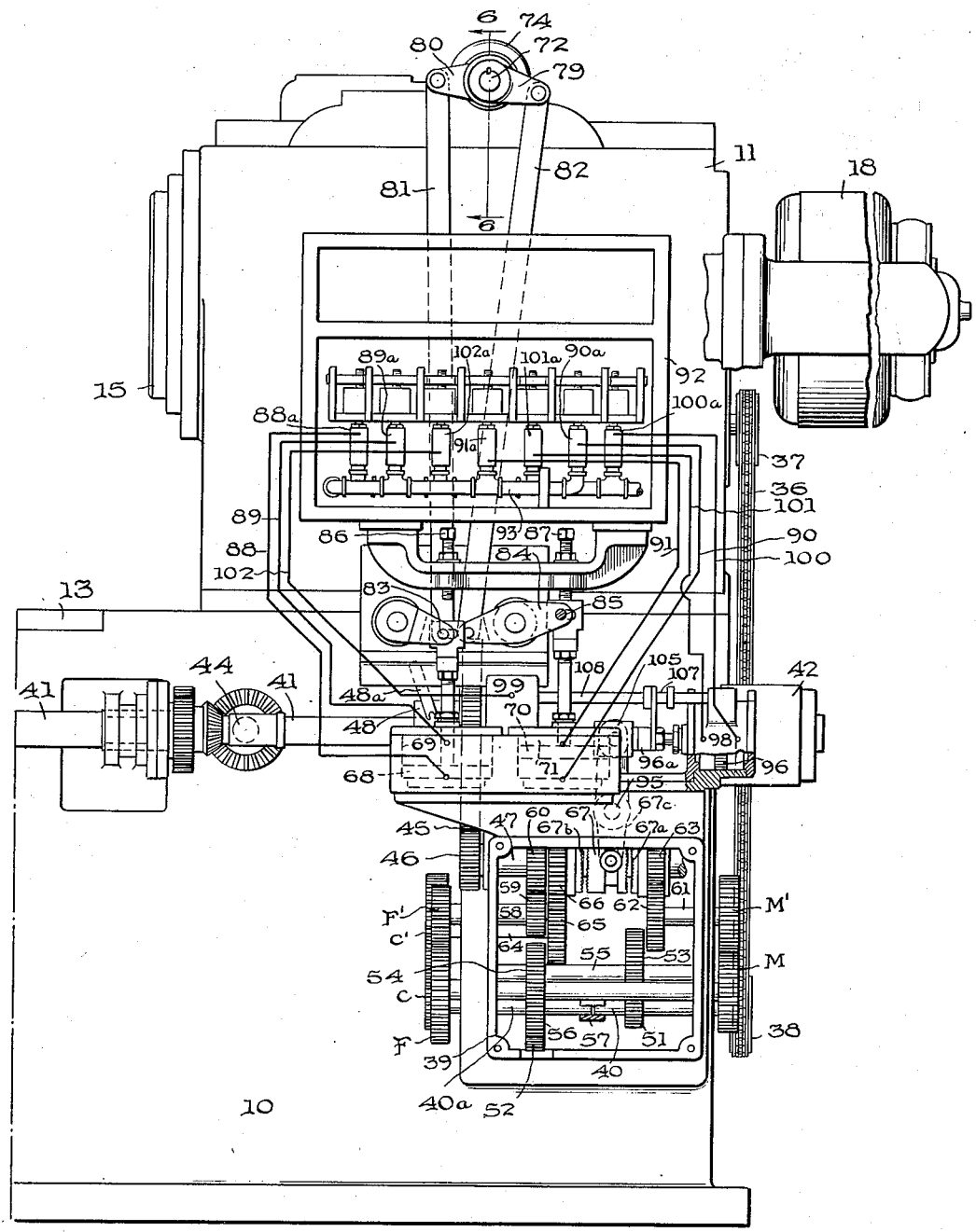

In order to provide for fast idle movements of the turret slide as well as for the cross-slides when used—i. e. after a cutting operation returning turret slide to its rearmost position, (to the left in Fig. 1) and then after indexing turret advancing it toward the spindle to cutting position—a high speed motor 42 is geared to the feed-shaft 41 (Figs. 2 and 3). The operation of this high speed motor 42 is controlled from the control dog drum 43 journalled within the base 10 under the headstock 11 (Fig. 3), and is driven from and synchronously with the feed shaft 41 by dog-drum shaft 44.

As more clearly shown in Fig. 2, a gear 45, of the overrunning type has its inner overrunning part rotatable on the feed shaft 41 while its outer part—carrying the gear teeth—is driven from the pinion 46 disposed on the outside of the feed box 39 and fast on an extending end of shaft 47 journalled within the feed box. However, the head of a frictional feed clutch 48, concentric with the shaft 41, is fast to said inner part of the overrunning gear 45, the sliding part or cone of said clutch being keyed to the shaft 41. The cone of the clutch 48 is operated through suitable linkage 48a controlled by dogs on the dog drum 43, which shift a lever 48b in opposite directions (which also may be manually operated) to engage and disengage the clutch to stop drive of feed shaft from spindle at the end of each cycle of the machine and to permit jogging. Also a lever 49, when moved in one direction, operates a switch 50 which closes the circuit to the high speed motor 42, and opens said circuit when moved in the other direction.

From the above it will be seen that, when the machine is in cutting operation, the drive to the feed shaft 41 is through the feed box 39 from the spindle 15; whereas, when the cutting operations have been finished, corresponding to the tools on any one face of the turret and the motor 42 being energized, the feed-shaft will run away from the outer part of the overrunning gear 45 and the turret slide 12 will be moved in fast motion by the motor 42 to its rearmost position where the turret is indexed and then again moved forwardly in fast motion to cutting position. Other means, not shown, may be employed for controlling the operation of the motor 42 when the clutch 48 is disengaged so as to stop all operation of the feed shaft 41 while allowing the spindle to rotate or manually jogging the feed shaft for setting-up purposes, but such mechanism is not necessary for an understanding of the present invention and has therefore been omitted from this description. In like manner, means may also be provided on the machine for automatically and manually disconnecting the drive, at 18, from the spindle transmission mechanism.

Respecting the feed box 39, the shaft 40 may be a divided shaft and has keyed to it pinion 51 and gear 52, which, respectively, mesh with gear 53 and pinion 54 both keyed on an intermediate shaft 55. Pinion 54 meshes with a gear 56 keyed to countershaft 57. The ends of shaft 57 extend through the feed box, one end having keyed thereto a gear F which meshes with a gear F' on stub shaft 58 which also has keyed to its other end a pinion 59 meshing with an overrunning gear 60 keyed on the shaft 41. The other end of the shaft 57 has keyed thereto a gear M meshing with a gear M' keyed on the stub shaft 61, which also has keyed to its inner end a gear 62 meshing with gear 63 rotatable on shaft 47. In like manner, the other extending end of the shaft 40 has keyed to it gear C meshing with gear C' keyed on stub shaft 64, which latter has keyed to it a gear 65 meshing with gear 66 rotatable on shaft 47. The gears C and C' are hand change gears for coarse feed, the gears M and M' are hand change gears for medium feed and the gears F and F' are hand change gears for fine feed. A clutch 67 is interposed between the gears 63 and 66, as shown particularly in Fig. 2, to connect either of them to the shaft 47 or, when neutral position, to disconnect both of them. This clutch may be of any suitable type, but is here shown as of the tooth type, comprising a slidable clutching member keyed on the shaft 47, and the opposing hub faces of these gear 63 and 66 being provided with complemental clutching surfaces 67a and 67b. Therefore, when the shaft 40 is driven and the clutch in neutral position, the feed-box mechanism is in fine feed and the drive is from pinion 51, gear 53, shaft 55, pinion 54, gear 56, hand change gears F and F', pinion 59 to the overrunning gear 60 which drives shaft 47, pinion 46 and overrunning gear 45 on the feed shaft 41. When the clutch 67 is engaged with the gear 63, the mechanism is in medium feed and the drive is from shaft 40, pinion 51, gear 53, shaft 55, pinion 54, gear 56, shaft 57, hand change gears M and M', shaft 61, gear 62, gear 63, clutch 67, shaft 47, pinion 46 and overrunning gear 45 on feed shaft 41. When the clutch 67 is engaged with the gear 66, the mechanism is in coarse feed and the drive is from shaft 40, pinion 51, gear 53, shaft 55, pinion 54, gear 52, shaft 40a, hand change gears C and C', shaft 64, gear 65, gear 66, clutch 67, shaft 47, pinion 46 and overrunning gear 45 on feed shaft 41. When the shaft 47 is being driven from either the gears 63 or 66, it will overrun the gear 60. The shaft 40 may be solid throughout, instead of divided as shown, in which case gear 52 is eliminated.

The above description explains those portions of an automatic turret lathe to which the present invention is concerned—that is, it is the operation of the two clutches 19a and 25a in the headstock unit 11 and the clutch 67 in the feed-box unit 39 under the automatic control of dogs 43a adjustably and selectively mounted on the dog drum 43 which makes one revolution for each cycle of operation of the machine. A cycle of machine embraces its operation where the turret slide has reciprocated back and forth relative to the spindle a number of times corresponding to the number of faces on the turret or to the number of faces which have been brought to index position for the tools thereon to perform work on a given subject-work-piece. The operation of these clutches is attained, to accomplish the objects of the invention, by an electro-pneumatic mechanism schematically shown in Figure 8 and more particularly shown, in detail and arrangement, by Figures 2, 3, 5, 6 and 7.

The yoke members 19b and 25b which actuate the sliding parts respectively of the clutches 19a and 25a are each operated by the piston 68 in its cylinder 69 and the piston 70 in its cylinder 71, respectively, which are disposed to the rear of the headstock end of the machine and supported from the feed box 39 (see Figs. 2, 3 and 6). On the top wall of the headstock is disposed a pair of nested rocker shafts 72 and 73, the latter being hollow and the former extending through the same and projecting for a distance beyond the ends of the hollow shaft 73. These shafts are rotatably journalled in a casting 74 disposed at the top of the headstock unit. Keyed on one extending end of the shaft 72 is a laterally extending arm 75 which has an operable connection with the yoke 25b which is slidably mounted on the guide rod 76. In like manner, on the adjacent end of the sleeve shaft 73 a laterally extending arm 77 is keyed which has an operable connection with the yoke 19b slidably mounted on the guide rod 78. The other adjacent ends of the nested shafts 72 and 73 each have keyed upon them, respectively, laterally extending arms 79 and 80 which project in opposite directions for purposes of clearance. The arms 80 and 79 are connected with the piston rods of pistons 68 and 70, respectively, by connecting links 81 and 82. The lower end of the rod 81 is connected to the piston rod 68 through a pin and slot connection 83, while the lower end of the rod 82 is connected to one end of a lever 84 which is fulcrumed intermediate of its ends and has its other end connected to the piston rod 70 through a pin and slot connection 85. Adjustable abutments 86 and 87 limit the movement of the pistons 68 and 70 in their direction of movement for engaging the clutches 19a and 25a and eliminate pressure and subsequent wear on the clutch yokes 19b and 25b, these abutments being in the form of screws 86 and 87 threaded in a fixed part on the machine frame.

As shown more particularly in Fig. 8, the cylinders 69 and 71 are each connected with an air pressure source at their opposite ends so as to render the pistons therein double acting so that they may be power operated in both directions. Tubes 88 and 89 connect, respectively, opposite ends of the cylinder 69, while tubes 90 and 91 are connected to opposite ends of the cylinder 71. These tubes each extend from the cylinders 69 and 71 to solenoid operated valves, respectively, 88a, 89a, 90a and 91a, disposed in a casing 92 on the back of the headstock 11. These solenoid operated valves are of a well-known standard make and type (known as a "prosperity" valve) shown in Fig. 9.

These valves comprise an elongated casing c having an opening in their lower end which receive a threaded nipple on a main air supply line 93, which line is connected with a suitable source of air supply, under pressure, which is available in all plants employing machine tools for sundry purposes as, for one, to actuate air-operated chucks. The interior of the valve casing c is divided by a partition having a bore therein longitudinally of the casing and at the ends of the bore are provided valve seats d and e. A plunger f reciprocates in said bore and has a valve d' thereon to cooperate with the seat d and has on its other end a valve e' slidable thereon and normally held against the seat e by a spring g, the valve e' being opened by the plunger f when the shoulder f' contacts in its downward movement the valve e' and opens it against pressure of the spring g. The solenoid s is mounted on the top of the valve and the plunger s' thereof depresses the plunger f when the solenoid is energized and raises it to full line position when the solenoid is deenergized.

Now, assuming that a point in the cycle of the operation of the machine has been reached where it is necessary to change the R. P. M. of the spindle 15, a dog 43a on the dog drum 43 actuates switch lever 88c, closing electric switch 88d, energizing solenoid of pneumatic valve 88a. This causes the plunger f of said valve to first seat valve d' closing the exhaust port h and then opening valve e' which allows air to flow from the main supply line 93 to the outlet port i into tube 88, cylinder 69, to raise piston 68 and through the mechanism previously described to engage clutch 19a. Due to the relatively slow movement of the dog drum 43, the dog thereon will maintain switch 88d closed for a time sufficient to complete the above operation, at which time the dog will move relative to the lever 88c so as to allow the switch 88d to open, thereby de-energizing the solenoid of valve 88a. The plunger of the solenoid is biased to raise plunger f of the pneumatic valve causing the valve member e' to close, under the influence of the spring g, and valve d' to open—thus allowing the air under pressure in the cylinder 69 and in the tube 88 to exhaust through the exhaust port h. To disengage the clutch 19a a dog on the drum 43 will similarly operate switch lever 89c and its switch 89d, at which time the piston 68 will be operated downwardly. The same operations as just described will take place when it is desired to operate the piston 70, it being understood, of course, that the appropriate switches and pneumatic valves will be so actuated. It will be clear that the pistons 68 and 70 may be operated at different times or at the same time to effect the desired speed change to the spindle 15. In the main air line supply 93, in advance of the various electro-pneumatic valves here employed, is disposed a pressure regulator 94 of any well-known type so as to normalize the air pressure flowing to the valves and protect the same from any violent fluctuations occurring in the air pressure system. Moreover, the pressure regulator 94 functions as a safety cut-out device by controlling an electric circuit 95 for actuating switches, not shown, that stop motors 18 or 42 to render the machine inoperative when the air pressure falls below a safe operating pressure for the electro-pneumatic valve as well as for the air chucking which may be used.

In addition to the changes in spindle speed, just described, which also correspondingly change the rate of feed of the turret slide 12 (and cross-slide when used), it becomes necessary and desirable to further automatically change the cutting feed speeds, at different points in the cycle of operation of the machine, independently of any change in the feed speeds brought about by the automatic change of the spindle speed. As previously described, this is accomplished by the transmission in the feed-box 39 by operation of the clutch 67. The clutch yoke 67c, which shifts the clutch 67, is pivoted intermediate its ends, as at 111, and, according to the present invention, is actuated to move into engagement with its complemental clutch members 67a or 67b by a pneumatically actuated piston 96 when the latter is moved to the extreme positions of its strokes in opposite directions. The clutch 67, however, is moved to its neutral position by pneumatically actuated piston 97 (see Fig. 5).

The piston 96 is disposed in cylinder 98 mounted on top of the feed-box at one end of the latter and piston 97 is disposed in cylinder 99 mounted on top of the feed-box 39 at the other end thereof. The cylinder 98 has air supply tubes 100 and 101 connected with opposite ends thereof to admit air pressure thereinto for shifting the piston in opposite directions while cylinder 99 has a single air supply tube 102 connected to a distributor or shuttle valve chest 103 which communicates with the cylinder 97 to admit air pressure to its opposite ends through ports 99a and 99b according to the position of the distributor 104 as determined by the position of piston 96.. The piston rods 96a and 97a are connected to the end of the yoke 67c, as at 105, for shifting the clutch 67; however, piston rod 97a employs a lost-motion connection, such as by a slot 106, which is of such length that a full stroke of piston 97 is the equivalent of one-half the stroke of piston 96 and, therefore, always will move the clutch 67 to neutral position.

The distributor valve 104 is reciprocated by an arm 107 rigid with and laterally extending from the piston rod 96a of piston 96 and has an opening therein through which extends an axial extension 108 of the distributor valve 104. A pair of abutments 109 and 110, fast on the extension 108, are arranged in spaced relation on opposite sides of the arm 107; these abutments may be in the form of adjustable collars as shown. The spacing of the collars 109 and 110 is such that only a portion of each stroke of the piston 96 is utilized as is required to shift the distributor valve 104 to open one of the ports 99a or 99b and close the other. Thus, it is clear that, when the piston 96 is in the extreme position of its stroke in either direction, the piston 97 will have been moved by it to a similar position and the distributor valve correspondingly moved.

The air supply tubes 100, 101 and 102 are connected to pneumatic solenoid valves 100a, 101a and 102a, respectively. Now, when a suitably positioned dog or drum 43 contacts lever 100c, switch 100d is closed energizing the solenoid of valve 100a and admitting air pressure through tube 100 to shift piston 96 to the left, thus engaging clutch member 67 with clutch member 67a. Similar operation of dog lever 101c actuates valve 101a to admit air pressure through tube 101 to shift piston 96 to its right hand position, thus engaging clutch member 67 with clutch member 67b. At any time when it is desired that the clutch member 67 should be in neutral position, a suitably positioned dog on drum 43 actuates dog lever 102c, causing valve 102a to admit air pressure to tube 102, through distributor valve 104 to the proper side of piston 97 which moves clutch member 67 from either of its engaged positions (and incidently the piston 96) to neutral position as shown in Figs. 2 and 8.

From the above it will be seen that the objects of the invention have been attained and that the change speed mechanism requiring instantaneous movement is actuated effectually with a greatly reduced number of parts and at substantially less cost. Having thus described the invention and the manner in which the same is to be performed, it is understood that certain changes may be made in the precise construction shown and described which fall within the terms of the appended claims.

That which is claimed as new, is:

1. A machine tool having a spindle, a change-speed transmission mechanism for driving said spindle, a slide movable to and fro relatively to the spindle to cooperate therewith for performing work, a change-speed transmission mechanism for driving said slide, said last mentioned transmission mechanism including a double-acting clutch having a shiftable member to be engaged when in opposite positions and to be disengaged when in neutral position; in combination with pneumatically operated devices for actuating said shiftable clutch member to opposite engaging positions, and another pneumatic operated device for moving said double-acting clutch to neutral position, a source of air pressure supply connected with said devices, a plurality of electrically operated valves in said air supply line and controlling the air pressure flow to said devices; and a control means, including manually adjustable members, actuated by the machine and further including electric switches operated by said members, whereby said valves are actuated at predetermined times in the operation of said machine to automatically and preselectably shift said shiftable clutch member to change the speeds of said transmission mechanism for said slide.

2. A machine tool having a spindle and a to and fro moving turret slide arranged in cooperative relation, a transmission mechanism for driving the spindle a second transmission mechanism driven from the spindle for actuating the slide during the cutting feed motions of the latter, each of said transmission mechanisms including clutches for changing the speed rate thereof, at least one of said clutches being double acting to be engaged when in opposite positions and to be disengaged when in neutral position; in combination with pneumatically operated devices for actuating said clutches, respectively, to engage and disengage said clutches, except the double acting clutch, and to move the latter in engagement in opposite movement thereof, another pneumatically operated device for moving said double acting clutch to neutral position, a source of air pressure supply connected with said devices, a plurality of electrically operated valves in said air supply line and controlling the air pressure flow to said devices; and a control means, including manually adjustable members, actuated by the machine and further including electric switches operated by said members, whereby said valves are actuated at predetermined times in the operation of said machine to automatically and preselectably shift said clutches to change the speeds of said transmission mechanisms.

3. In an automatic turret lathe the combination of a spindle and a cooperating turret slide movable to and fro relative to the spindle, means for actuating the spindle, a power transmission mechanism for actuating the slide from the spindle and having change speed clutch devices therein, a plurality of pneumatically operated cylinder and piston devices for actuating said clutches, respectively, a source of air pressure supply connected with said devices, a plurality of electrically operated valves and circuits therefor in said air supply line and controlling the air pressure flow to said devices; and a control dog drum actuated by the power transmission means for the slide, manually adjustable dog members on said drum, and electric switches in said circuits and operated by said dog members, whereby said valves are actuated at predetermined times in the operation of said machine to automatically and preselectively shift said clutches to change the speeds of said transmission mechanism.

4. In an automatic turret lathe, the combination of a spindle and a cooperating turret slide movable to and fro relative to the spindle, means for actuating the spindle and slide, including change speed mechanism, pneumatically operated cylinder and piston means for actuating said change speed mechanism including a source of air pressure supply, a plurality of air valves controlling the air supply to the pneumatically operated means, solenoids and electric circuits therefor for actuating said valves, a control dog drum actuated by the operation of the machine including a plurality of manually adjustable dog members and further including electric switches in said circuits and operated by said dog members to energize and de-energize said solenoids, whereby said valves are actuated at predetermined times in the operation of said machine to automatically and preselectably shift said change speed mechanism.

ALFRED JOSEPH FULLER.